United States Patent [19]
Marion

[11] 3,941,550
[45] *Mar. 2, 1976

[54] APPARATUS USING SOLID INSULATING MATERIAL AS A CENTER PLATE BETWEEN MULTIPLE FLAT EXTRUSION STREAMS

[76] Inventor: George J. Marion, 691 E. Boot Road, West Chester, Pa. 19380

[ * ] Notice: The portion of the term of this patent subsequent to Mar. 19, 1991, has been disclaimed.

[22] Filed: Jan. 22, 1974

[21] Appl. No.: 435,496

Related U.S. Application Data

[63] Continuation-in-part of Ser. No. 223,436, Feb. 4, 1972, Pat. No. 3,797,987, which is a continuation-in-part of Ser. No. 861,047, Sept. 25, 1969, abandoned.

[52] U.S. Cl............ 425/463; 425/378 R; 425/382 R
[51] Int. Cl.² ............................................ B29F 3/00
[58] Field of Search................... 425/378, 382, 463; 156/500

[56] References Cited
UNITED STATES PATENTS

| | | | |
|---|---|---|---|
| 2,718,661 | 9/1955 | Russell | 425/466 |
| 3,611,492 | 10/1971 | Scheibling | 425/462 X |
| 3,797,987 | 3/1974 | Marion | 425/466 |

Primary Examiner—Richard B. Lazarus
Attorney, Agent, or Firm—Jackson, Jackson & Chovanes

[57] ABSTRACT

A multiple outlet flat film die apparatus and process which extrude separate streams of material to form any of various composites which may involve joining of similar or dissimilar materials, which includes individual manifold chambers separated from each other by heat insulating means inbetween. The heat insulating means in between such as for example heat insulating material between plates retards heat transfer between the materials. Each manifold is tapered toward its own die mouth; has separate melt inlets adapted for center, top and/or end feed operations; has separate pre-land and final land surfaces leading to individual outlet openings for precise control of melt flow; and has separate heat control means allowing precise temperature control for each melt as it flows toward the die. Temperature differentials may be extensive and may approach the difference between the original temperature of the melt delivered to each manifold. Heat differentials of 0° to 200°F. are an example. A differential push-pull adjustment system for the movable lip of each outlet opening inlcudes opposed alternatingly staggered thimble bolts for precise control of each individual profile layer. Methods of laminating the extruded layers to each other as well as to other substrates are included.

2 Claims, 16 Drawing Figures

FIG. 16

APPARATUS USING SOLID INSULATING MATERIAL AS A CENTER PLATE BETWEEN MULTIPLE FLAT EXTRUSION STREAMS

CROSS REFERENCE TO RELATED APPLICATIONS

This is a continuation-in-part application of my copending U.S. application Ser. No. 223,436, filed Feb. 4, 1972 now U.S. Pat. No. 3,797,987, issued Mar. 19, 1974, for Coextrusion Apparatus for Flat Film, which is incorporated herein by reference, and which in turn is a continuation-in-part of my application U.S. Ser. No. 861,047, filed Sept. 25, 1969, now abandoned; for Apparatus For and Method of Ribbon Extrusion, Coating and Forming, copending with it, which is likewise incorporated herein by reference, and as to which the present application is also a continuation-in-part, relying on a chain of copendency.

PRIOR ART

Apparatus for the coextrusion of flat multi-layer films of at least certain thermo-extrudable material is known. Certain of such apparatus includes separate manifolds feeding individual melts to a common passageway so that contiguous boundaries between adjoining melts are formed and the resulting melt stream exits from the apparatus as a composite film. However, in such systems complex adjustments are necessary to achieve individual melt thickness control and only materials having similar resin rheology are usable. Further, individual temperature control for each melt in such systems is not readily attained, especially during flow along the common passageway. Other known apparatuses utilize a single manifold for receiving a plurality of melts and a special adapter within the manifold lines up the melt stream in a desired sequence. In such systems, the resins utilized must have about equal apparent melt viscosities in order to attain uniformity in thickness ratios and individual melt temperature control is not readily attainable because of the contiguous flow streams of the separate melts. Yet other known apparatuses produce composite blown film wherein different melts are combined inside or outside a die. Blown films require additional processing, that is collapsing of a bubble, slitting, folding, etc. and are thus considered relatively undesirable for the production of sheet products. Further, composite blown films do not exhibit sufficient bonding between the individual layers. Blown film dies wherein the different melts combine inside the die do not allow individual melt temperature and/or thickness control. Known blown film dies wherein the different melts combine outside of the die are incapable of adjusting the individual layers thicknesses or of regulating the temperature of each melt. All of the various known coextrusion flat-film apparatuses allow edge buildup on the extruded layers, which is highly undesirable and comprises waste.

It is an object of the invention to provide an improved coextrusion apparatus for flat film that includes precise temperature control for each melt, precise profile control for each extruded layer and avoidance of edge buildup.

Summary of the Invention

The invention provides an economical and easily operable coextrusion flat-film apparatus for a wide range of thermo-extrudable mateials, such as resins, waxes, etc. The apparatus includes a die body having at least a pair of streamlined manifold chambers, each of which has a separate inlet. Each manifold is tapered into a separate pre-land surface and final land surface for directing a melt toward a separate outlet opening or slot. A rigid plate is positioned between each manifold and associated pre-land and final land surfaces to maintain separate melt passages throughout the die body. The rigid centerplate is composed at least partly of heat insulating material so as to prevent or impede heat conduction across the plate. It is intended also by the present invention to provide reduced neck-in which is related to the matter of edge buildup. Among other things, it is more especially a purpose of this invention to enable the maintenance of temperature extremes between the melts which approaches the initial temperature between the melts.

Another purpose of the invention is to reduce the expense of the operation as a whole.

A further purpose of the invention is to enable the use of spray means between the different melts as well as different extruders and different sources.

A plurality of individual heat control means are provided along each side of the die body in association with each manifold, pre-land and final land surfaces so that individual temperature control of each melt is achieved throughout the individual melt flow passages in the die body for improved bonding characteristics. In certain embodiments, opposite sides of the centerplate are provided with individually controllable heating and/or cooling means to insure that the melt within each flow passage experiences uniform temperatures on all sides thereof. Internal and/or external deckle means are utilized for individual final land surfaces to avoid edge buildup of the extruded layers. The deckle means selectively block the outlet slots by a predetermined amount for the material being extruded, generally depending upon the amount of neck-in occurring in an extruded layer of each material before solidification or support thereof. In certain embodiments external deckle means are also provided along the length of the outlet slots for extrusion of a plurality of ribbons. The outlet portion of each final land surface is adjustable, as for example by being made flexible and opposing alternatingly staggered thimble adjustment bolts are provided on each side of the die body in the vicinity of each of the outlet slots for precise profile control of each extruded layer, thereby minimizing hills and valleys within the individual layers. In certain embodiments, gas passageways are provided through the centerplate for feeding an oxidizing gas or the like between the extruded layers for improved bonding between certain extrudable materials.

Methods of laminating the extruded layers to each other as well as to various different substrates are also provided by the invention. The differential heating of the extruded layers allows, for example, the layer contacting a substrate to be heated to a somewhat higher temperature than the outer layer whereby better bonding between the substrates and layers occurs at a lower overall heat level and at less deterioration to the composite film.

BRIEF DESCRIPTION OF THE DRAWINGS

An understanding of further particulars of the invention may be obtained from a consideration of the following detailed description of representative embodiments thereof, taken in conjunction with the accompanying figures in the drawing in which.

DESCRIPTION OF THE PREFERRED EMBODIMENTS

The invention provides an apparatus for the extrusion of multiple flat films or sheets for ultimate creation of materials including more than one such film or sheet, wherein precise temperature and thickness control for each extruded layer are achieved, and edge buildup is substantially eliminated.

Coextrusion is defined herein as a single extrusion process that combines two or more thermal-extrudable materials, such as thermoplastics, resins, waxes, hot melt adhesives, etc. in a molten state into a composite film which is ready to use as such or is bonded to another substrate. The apparatus embodiments of the invention include a die body having a plurality of manifold chambers separate from one another by a rigid portion extending between the chambers. Each chamber is streamline tapered toward its own outlet opening and is provided with separate pre-land and final land surfaces, extending sequentially toward separate outlet openings or slots for improved melt flow control. A plurality of separate manifold chambers, pre-land and final land surfaces as well as separate outlet slots provides improved throttling of each melt, improved layer thickness control and improved layer ratio control by separate precise adjustments of each of the lip portions adjacent each outlet slot. Adjoining alternatingly staggered thimble bolts are associated with each of the outlet slots for precise profile control of each extruded layer. Heat control means are associated with each melt flow passage within the die so that the temperature of each melt is fully and independently regulated throughout its flow within the die body.

Deckle means, external, internal or a combination thereof, are associated with each of the outlet slots in an offset manner from each other to substantially eliminate edge buildup along the width of the extruded layers that otherwise occurs in extruded flat film. The external deckle means comprises a boat-type carrier member that straddles the outlet slots at selected locations along the length thereof, as at the end edges of each slot and holds the deckle block member having offset end portions in sealing relation against the slots so that different width layers are extruded from each slot. In this manner, each extruded layer has less than half of the bead dimension that is present on non-deckled films or on uniformly deckled films. The internal deckle means comprises rod-like members associated with the final land surfaces of each outlet slot and extend inwardly different amounts for each outlet slot so that different width layers are extruded from each opening. Internal and external deckle means can be combined on a single die body.

A wide variety of thermo-extrudable materials can be coextruded in accordance with the principles of the invention. Thermo-plastic resins of diverse melt indexes and/or melt rheology are readily coextrudable in accordance with the invention and include for example: acrylonitrile-buatdiene-styrene copolymers, acetyl homopolymers, and copolymers, acrylic polymers, cellulistic polymers, ethyl acylic ester polymers, ethyl vinyl acetate polymers, fluoroplastic polymer, ionomer polymers, methyl pentane polymers, polyamide (nylon) polymers, phenoxy polymers polyallomer copolymers, polycarbonate polymers, polyethylene polymers, polyester polymers, polyimide polymers, phenylene oxide polymers, polypropylene polymers, polystyrene polymers, polysulfono polymers, polyvinyl chloride polymers, polyvinylene chloride polymers, polyurethane polymers, etc. These resins can include foaming agents, coloring additions, anti-friction additives, etc. Further, certain of the resins may be expanded form, as foamed resins. Other thermo-extrudable materials coextrudable in accordance with the principles of the invention includes, for example, natural and synthetic waxes, paraffins, hot melts, adhesives, coloring agents, etc.

Figure 1:
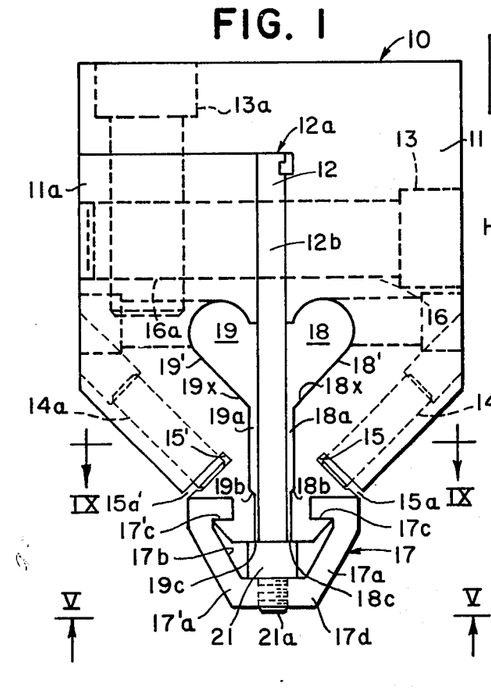
FIG. 1 is an elevational diagrammatic view of an embodiment of the apparatus of the invention.
Figure 2:
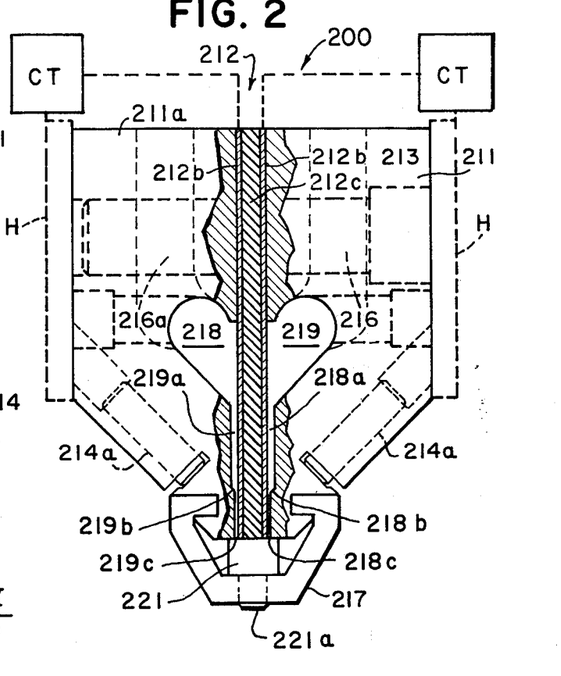
FIG. 2 is an elevational view, partly in section, of a somewhat altered embodiment of the apparatus of the invention

Referring now to the embodiment of FIGS. 1 and 2 a die body 10 is comprised of a first body portion 11 and a second portion 11a, which are assembleable into a single body formed of two mirror-image portions. Such mirror-image portions are economically manufactured and reduce the overall cost of the die body 10. Of course, if desired, the die body 10 may be formed of a single monolithic body. The body portions 11 and 11a are rigidly held in assembly by bolt means, and an exemplary horizontal bolt 13 and an exemplary vertical bolt 13a are shown.

A centerplate member 12 is positioned between the body portions 11 and 11a and is of an essentially rectangular shape for ease of machining. A key-like member 12a locks the plate 12 along its upper portion with an appropriately shaped groove or the like in body portion 11. Other means of securing the plate to the body portions can also be utilized, for example, the plate may be L-shaped for clamping between the body portions or bolts or the like may be utilized to secure the plate to one of the body portions. The centerplate member 12 is composed of a solid heat-resistant material 12b and side surfaces which are suitably of metal as explained in more detail in connection with FIG. 2.

Melt inlet passages 16 and 16a correspondingly are provided in each of the body portions 11 and 11a. In the embodiment shown in FIG. 1, the inlet passages 16 and 16a are adapted for center feed operation. If desired, melt inlet passages can be adapted for end or top feed operation. Extruder conduits or connecting adapters 112 and 112' respectively (best seen in FIG. 11) interconnect inlet passages 16 and 16a with at least one extruder providing a thermo-extrudable material and preferably with a plurality of extruders providing a different melt to each inlet passage. The die body of the invention can be connected to extruders by means of machined rigid connecting adapters or by flexible coupling adapters formed of standard hydraulic stainless steel tubing, such as capable of withstanding pressures of about 10,000 psi. While the inlet passages 16 and 16a are illustrated as being horizontally orientated angular and veritical orientation, any other suitable inlet passage may be used.

Manifold chambers 18 and 19, respectively, are disposed within each of the body portions 11 and 11a so that the inner boundary of each chamber is continguous with a side surface of the centerplate member 12. The manifold chambers 18 and 19 are somewhat streamlined and tapered downwardly toward the side surface of the centerplate 12. The boundaries of the chambers 18 and 19 extend into the body portions 11 and 11a respectively, and are somewhat tear-shaped for improved flow characteristics of melts therein and for improved heat distribution. Each of the manifold chamber outer walls 18' and 19' taper toward points 18x and 19x respectively, directing the melt flows within each of the chambers toward the centerplate 12. Pre-land surfaces 19a and 18a join the outer walls 18' and 19' of each chamber at points 18x and 19x respectively. The pre-land surfaces 18a and 19a cooperate with opposite side surfaces of the centerplate 12 to define first relatively narrow melt flow passages for coarse throttling or control of each melt stream. Final land surfaces 18b and 19b, respectively, join the pre-land surfaces 18a and 19a and in cooperation with the side surfaces of centerplate 12 define second relatively narrower melt flow passages for fine throttling or control of each melt stream. The final land surfaces 18b and 19b terminate at the bottom of die body 10 and in cooperation with the terminal end of the centerplate 12 defined at least a pair of side-by-side outlet slots 18c and 19c respectively. The outlet slots 18c and 19c are spaced apart but relatively close to one another so that the extruded melt layers may be readily bonded to one another or to a substrate while in their molten state. The manifold chambers 18 and 19, the pre-land surfaces 18a and 19a, the final land surfaces 18b and 19b and the outlet slots 18c and 19c extend substantially along the entire length of the die body 10 and are closed from ambient environment along their ends by a pair of end plates (not shown).

A pair of relatively deep narrow grooves 15 and 15' are along the respective outer walls of the die body portions 11 and 11a. The grooves 15 and 15' extend inwardly along each body portion for a given distance at approximately a 45° angle to the centerplate. This configuration of the grooves 15 and 15' toward the pre-land surface 18a and 19a, respectively, allows the body portions below the grooves to move in respect to the body portions above the grooves. Since the upper and lower body portions are formed from a unitary piece of material, inherent strength and flexibility of such portions are assured. Certain prior art arrangements provide movable lips on a die but are composed of a plurality of separate pieces and thus lack inherent strength and flexibility of a unitary body.

Figure 4:
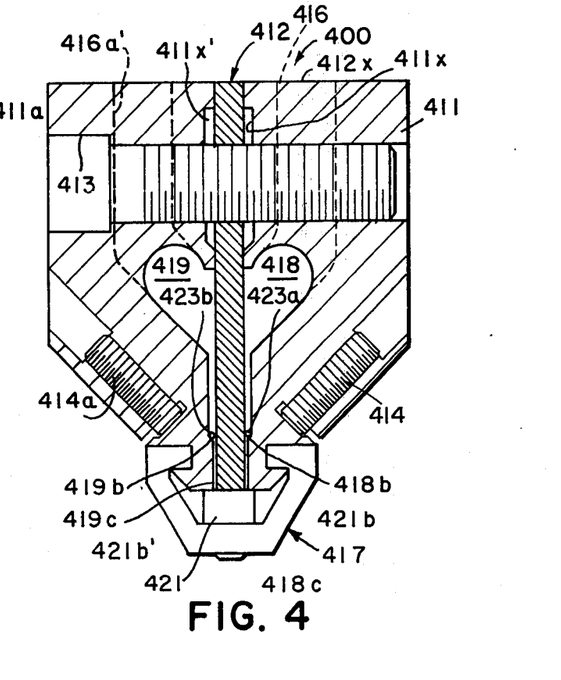
FIG. 4 is an elevational view partly in section, of a form of the invention still further modified from that of FIG. 2.

Adjustable thimble bolts 14 and 14a are positioned within the body portion above the grooves 15 and 15' so as to have their inner ends abut against the lower groove walls for selectively moving the body portions below such grooves toward and away from one another and thereby adjust the width and profile of the outlet slots 18c and 19c respectively. As best seen in FIG. 4, the thimble bolts 414 and 414a are in an opposing alternating staggered relation to each other along the length of the die body. This arrangement is contrary to conventional die lip adjustment means and eliminates hills and/or valleys in each of the extruded layers so that a substantially uniform caliber of composite film is produced.

A pair of relatively shallow grooves 15a and 15a', respectively, are provided along the respective outer walls of body portions 11 and 11a and positoned below the grooves 15 and 15' but above the outlet slots 18c and 19c. The grooves 15a and 15a' extend inwardly substantially perpendicularly to the final land surfaces 18b and 19b and accommodate an external deckle bar carrier member 17. While only one deckle bar carrier member is shown, a plurality of similar members can be provided along the length of the die body and in certain preferred embodiments at least a pair of such carrier members are utilized, on at each end of the die body. Since the carrier members are all essentially identical in construction, only one carrier member will be descirbed in detail.

The deckle bar carrier member 17 is generally referred to as a "boat" deckle and is preferably formed from a single piece of relatively strong heat-resistant material, such as metal. The boat deckle or carrier member 17 includes a pair of uniformly extending arms 17a and 17a', respectively, which terminate in inwardly turned ends 17c and 17c', respectively, to be slidably received in grooves 15a and 14a', respectively. Means for selectively moving the deckle boat along the length of the die body may be provided and may comprise rack and pinion arrangements or threaded rods or hydraulic cylinders so that the deckle boat may be precisely moved to a desired location and positively locked in place at such location. Other means of moving such deckle boats are also available.

The deckle boat 17 is formed with a somewhat U-shaped recess 17b having a bottom wall 17d opposite the outlet slots 18c and 19c respectively. The deckle bar 21 is formed so that it can be received within a recess 17b for limited reciprocal movement toward and away from the outlet slots 18c and 19c. The deckle bar 21 is shown as being a solid body, such as of a suitable heat-resistant metal, though it can be one or more strips such as packing strips, such as asbestos impregnated with graphite or polytetrafluoroethylene.

Means for regulating the pressure or sealing force of the bar 21 against the outlet slots 18c and 19c include a plurality of set screws 21a which are externally threaded through the bottom wall 17d of the deckle boat 17. Other means include the use of biasing members between the packing strips and their support bodies.

As indicated earlier, end plate members are suitable secured as by bolts to each end of the die body 10 so as to prevent the melt from scaping the confines of the die body. Means for regulating the heat along each of the melt flow passages throughout the die are operationally attached to the die body and provide an independent temperature for each melt as desired. Suitable heating means include resistant heaters, such as cast-in aluminum heaters that are comprised of, for example, an electrical heating element cast into an aluminum jacket for attachment to desired portions of a die body. One heating means includes a plurality of flow passageways for circulating a heating medium within the selected portions of the die body. The heating means allows a select temperature differential to exist between the melt extruded from the respective outlet slots, which may be 0° to 200°F. or more. Such heating differential provides improved bonding characteristics between various thermo-extrudable materials and/or between such materials and various substrates.

As shown more in detail in FIG. 2 a die body more specifically illustrated as 200 is comprised of a plurality of elements, each referred to by a reference numeral which is identical to the number utilized in discussing similar elements in die body 10 of FIG. 1, except that the instant numerals are in the 200 series. Thus the die body 200 is comprised of die body portions 211 and 211a, respectively. Tapered manifold chambers 218 and 219, respectively, are positioned within their respective body portions 211 and 211a and provided with individual melt inlets 216 and 216a. The tapered somewhat tear-shaped configuration of the manifolds 218 and 219 provide for improved heat distribution within a melt in such manifolds and also provide relief from extrusion pressure. The pre-land surfaces 218a and 219a, respectively, final land surfaces 218b and 219b, respectively, and outlet slots 218c and 219c, etc. are all essentially identical to similar portions of the die body discussed in FIG. 1 so that no additional discussion is necessary.

As will be understood from the description and drawings which have already been made of the setup as involved in the actual figures, the manifold chamber shown in the figures such as chambers 18 and 19 of FIG. 1 are manifold chambers whose cross section is throughout their lengths as shown in the typical section of the figures. This is the type of manifold which would normally be provided.

However, in some cases especially where a material which changes with the time it is subjected to heat is involved, such as polyvinyl chloride, it is desirable to use a manifold in which the material comes in in one central opening above the manifold as may equally well be done with the manifolds of the drawings, but then instead of this inlet going down to the point where it contacts manifolds from the lengthwise direction, the manifold itself will have a lengthwise section which at the top resembles the top of a wire coat hanger, tapering gradually down from the central point as it gets toward the outside point. With such a manifold, the material will come at the central point and then some of it will start separating out as permitted by the beginning of the tapering manifold and will spread out to the outermost point of the manifold, while other material at the same level is simply flowing down so that the material will not have to wait until it gets to the beginning of a straight manifold to start the spread out as part of its travel.

The manifold chamber will give in tapering fashion into a pre-land, and then with decided constriction in a streamlined manner will narrow to a final land surface, this final constriction giving also special pressure.

The centerplate 212 of die body 200 is composed of metal pieces 212b and 212b' separated by solid heat-insulating means, such as a sheet of asbestos 212c. The width dimension of centerplate 212 varies from embodiment to embodiment but is generally relatively thin, such as about 0.25 to about 1.5 inch. In certain embodiments, the metal plates 212b and 212b' include an embedded heating element (not shown) that is operationally connected to a controllable heat energy source CT, as shown by the dotted lines. The asbestos sheet 212c prevents any suitable heat transfer across the centerplate member 212. Other heating means H are also operationally associated with the die body 200 and are operationally connected to an energy source CT. It will be noted that each side of the die body has a separate controllable energy source CT, for example, a rheostat-like control connected to an electrical power source. Heating means H comprises a plurality of separate individual resistance heaters, each connected to a controllable heat-energy source CT so that different portions of the die body can receive selective amounts of heat, such as an increased amount of heat at one or both ends thereof to insure that the melt has the same flow characteristic across the entire length of the die body.

Assuming that the melts are maintained at a different temperature, for the purposes of maintaining one or the other at a different composition, such as softness, stickiness or the like, it will be evident that it is very desirable to limit the heat flow between them, so as to maintain this condition constant and unimpaired. It will be evident that it is very disruptive to have leakage of heat from the higher temperature across the centerplate to the lower temperature, and therefore it is a distinct improvement if the higher temperature melt can be maintained at a constant temperature to the edge, which maintains the melt at a constant consistency in respect to stiffness, stickiness or rheology.

Edge bead and/or edge buildup is one of the most serious problems encountered in the extrusion of flat films or sheets and generally comprises the non-uniform thickness of the extruded sheet throughout the widths thereof, particularly at the edges thereof. The thickness of the edge bead may be 300 to 500% greater than the caliber or thickness of the sheet at its center portion (See FIGS. 15 and 10 for a partial cross sectional view of the edge beads in accordance with the prior art and in accordance with the instant invention respectively). This is, of course, highly undesirable and edge beads are trimmed and usually discarded as waste. Of course when such extruded sheets are coated onto a substrate, the edge portions of the substrate must also be trimmed and discarded. This is extremely uneconomical. Causes of edge buildup vary with various thermo-extrudable materials, melt temperatures, viscosity or melt indexes, densities, surface tension effects, etc. Since substantial economical advantages would result from the elimination and/or reduction of edge buildup, various attempts to eliminate edge beads have been made, generally without success. The combination of improved heat distribution and regulation within the individual melt streams in the die body and the deckle means provided in accordance with the principles of the invention substantially eliminates or in certain instances reduces by a factor of about 50% edge beads otherwise present on extruded flat film.

Figure 3:
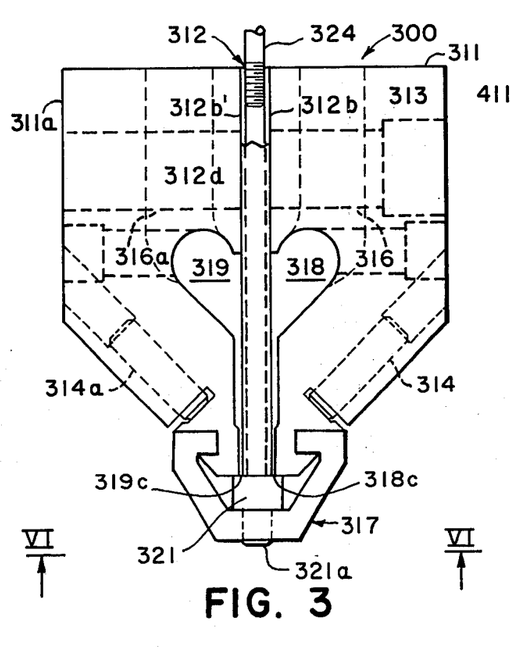
FIG. 3 is an elevational view partly broken away of a form of the invention like that of FIG. 2, but somewhat modified therefrom.

In each of FIGS. 2, 3 and 4, the reference characters are the same as those of FIG. 1, except that the figure number is applied ahead of the reference character.

FIG. 3 the center plate has provision for a liquid heating or cooling medium at 324.

FIG. 4 shows internal deckles and provision for cooling at 411, and 411'.

Figure 5:
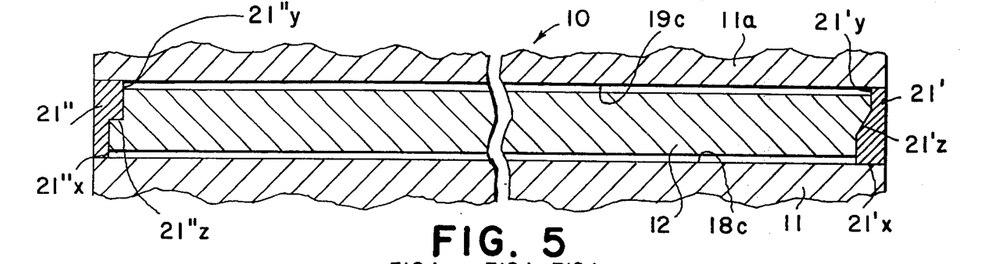
FIG. 5 is a fragmentary partial bottom sectional view along the line V—V of FIG. 1.
Figure 6:
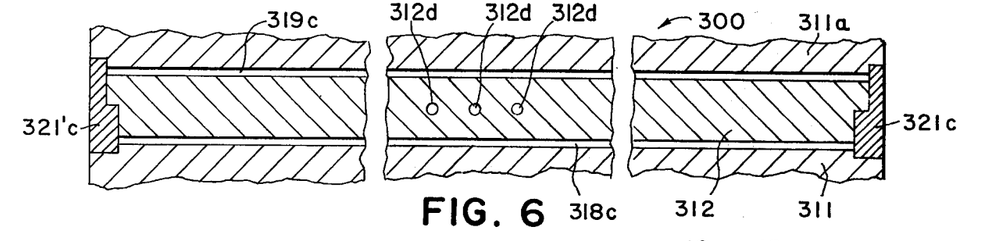
FIG. 6 is a view like that of FIG. 5, of a somewhat modified form of the invention, being along the line VI—VI of FIG. 3.
Figure 7:
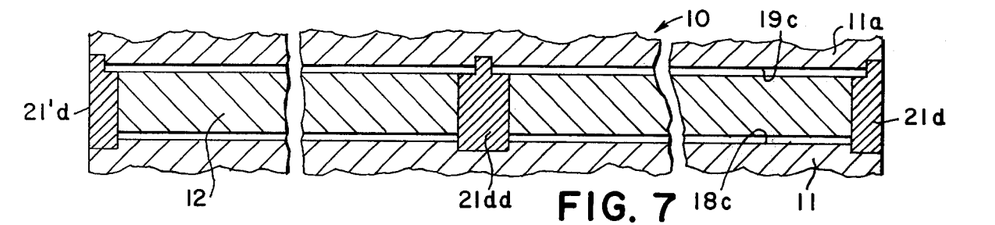
FIG. 7 is a view like that of FIGS 5 and 6 of a still further modified form of the invention.

Referring now in further detail to the deckle means of the invention, FIG. 5 illustrates certain specific embodiments of the deckle bars 21, shown in working relation to die body 10 having outlet slots 18c and 19c, respectively. In the right hand embodiment, deckle bar 21' is formed so as to have a stepped inner side edge or face comprised of a first step 21'x and a second step 21'y, joined to the first step by a gradual or sloping juncture 21'z. The steps 21'x and 21'y seal off different lengths of each outlet slot 18c and 19c so that the extruded sheets have offset widths or side edges. Such deckle bars substantially eliminate edge beads with most thermo-extrudable materials and in others cause a reduction of edge bead so that when the offset edges of the extruded sheets are bonded together or onto a substrate, the two offset edges cannot combine and the variation in thickness at such edges is very minor and very little, if any, extruder trim is required. In the left handed embodiment, deckle bar 21'' is formed somewhat similarly to deckle bar 21' and has a stepped inner edge or face comprised of a first step 21''x and a second step 21''y, joined to the first step by a sharp or straight juncture 21''z. Since the steps 21''x and 21''y are offset from each other and are aligned so as to overlap or seal only one of the outlet slots 18c or 19c, respectively, the edges of the sheets extruded therefrom are likewise offset. Deckle bars 21' and 21'' are utilizable on opposite ends of the same die body so that the resilient composite film has opposingly staggered side edges, allowing one side to be trimmed of one material and the other side to be trimmed of another material, whereby both materials can be recycled as desired so that no waste results. Of course, an opposing pair of deckle bars 21' or 21'' may also be utilized on a single die body and only the same material be trimmed from both sides of the resulting composite film.

FIG. 5 illustrates a portion of a die body 10 comprised of body portions 11 and 11a and centerplate member 12 so as to define a pair of closely adjacent outlet slots 18c and 19c wherein thimble bolts 14 and 14a are uniformly staggered on opposite sides of the die body for selective movement of each outer wall of each of the die slots. Thimble bolts 14 and 14a allow precise control of each layer of thickness and because of the uniform staggered relation, allow elimination or reduction of hills and valleys in the composite extruded film so that a substantially uniform caliber of film or coating is readily attained along the entire width of the die. The width of each outlet slot is precisely and uniformly adjustable by selective movement of the outer wall thereof so that uniform gauge thickness can be maintained for each film. The gauge thicknesses range normally from about 0.1 to 10 or more mils (0.001 to 0.01 inches).

Figure 8:
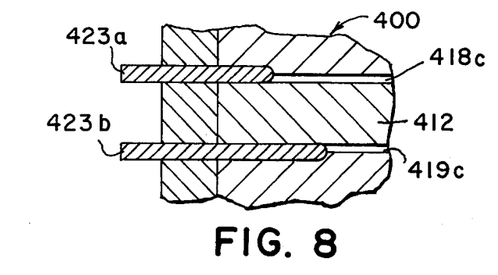
FIG. 8 is a view like that of FIGS. 5 through 7, but limited to one end of the die, of a still further modified form of the invention.
Figure 9:
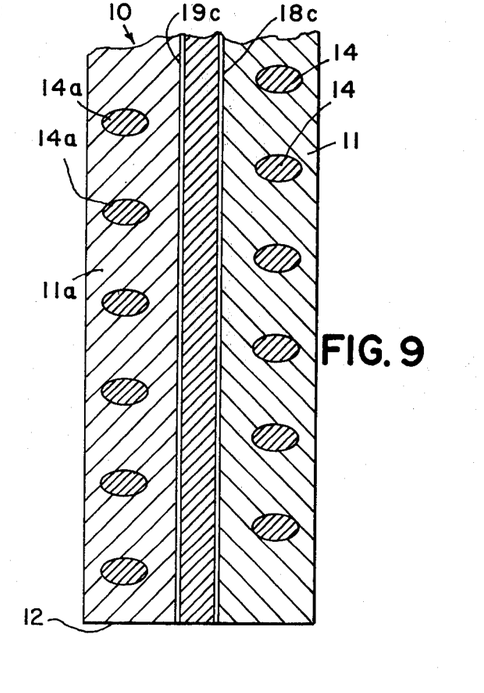
FIg. 9 is a partial sectional view along the line IX—IX of FIG. 1.
Figure 16:
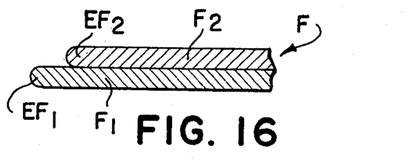
FIG. 16 is a view somewhat similar to FIG. 10, but illustrating a partial cross-sectional view at the edge of solidified film layers formed by the invention.

FIG. 8 shows provision for inserting an internal deckle at 423a and 423b so that a multiple layer film of FIG. 16 will be produced.

Figure 10:
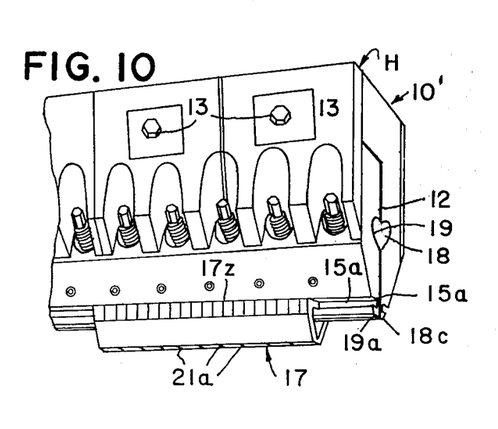
FIG. 10 is a partial perspective view of an embodiment of the invention.

FIG. 10 is a partial perspective view of the die body 10' constructed in accordance with the principles of the invention, with an end plate removed for the sake of clarity. The die body 10' is somewhat rectangular in configuration, with convergingly sloping bottom walls that terminate in a pair of closely adjacent outlet slots 18c and 19c. A deckle boat 17 is mounted for selective movement among grooves 15a situated above the outlet slots. The deckle boat 17 may be provided with indicia markings along visible surfaces thereof such as distance indicia so that an operator can readily determine the position of the deckle boat in relation to the die body. The deckle boat 17 includes means for positively moving and securing the same to a given location along the length of the die body such as means 17z. A plurality of heating plates H are secured along the side portions of the die body and are appropriately connected to an energy source (not shown) so that each heating plate H can be independently regulated to provide a desired amount of heat to its portion of the die body.

The heating means associated with the die body provides precise temperature control of each melt through its flow passages within the die. Each of the heating means is independently controllable and substantial temperature differential between adjacent melts is readily attained. This is an important feature of the invention since it allows one melt to be heated to a substantially greater temperature while the other melt is maintained at a relatively lower temperature. This feature not only allows completely different thermo-extrudable materials to be coextruded, but also, during coating operation, allows the melt to be directly joined to a substrate to be heated to a higher temperature whereby improved bonding is achieved while at the same time minimizing deteriorations and/or odor from the other melt maintained at a lower temperature.

The deckle means, whether external deckle bars, the internal deckle rods or a combination thereof, is so positioned onto outlet slots that offset end edges result in the extruded sheets thereby greatly reducing and/or eliminating edge buildup. The amount of offset required between the adjacent end edges of the outlet slots to avoid edge buildup depends upon a relatively large number of complex factors, which may be summarized by stating that the amount of offset depends upon the amount of neck-in occuring for a given thermo-extrudable material at given operating conditions before such material solidifies or reaches a support, such as a substrate. For example, when the thermo-extrudable material forming both melts is polyethylene, the end edges of the outlet slots are deckled so as to be offset from each other about 0.125 to about 0.375 inch (⅛ to ⅜ inch) and preferably 0.25 inch. Other thermo-extrudable materials require different offset end edges to avoid edge buildup and the exact amount thereof is readily determined by simple observation during operation. The deckle means of the invention is easily adjustable to provide various amounts of edge offset during operation of the die so that an operator can readily adjust the same as required to substantially eliminate edge buildup during coextrusion of any given combination of thermo-extrudable materials.

In its method embodiments, the invention generally comprises extruding at least two separate melts in the form of flat streams or sheets in spaced apart but closely adjacent position arranged so that their respective side edges are offset or staggered from each other, contacting and bonding such separate molten sheets to one another and/or to a substrate and cooling the bonded melt sheets into a multilayer composite film. The extruded melt may be of the same thermo-extrudable material or of different thermo-extrudable materials. The offset arrangement of their end edges substantially reduces or eliminates edge buildup in the solidified composite film so that substantially no trimming at the extruder is required. Bonding of the molten sheets to each other or to a substrate occurs by contact between the materials to be bonded, with or without pressure urging such materials closer together. Coextrusion of two layers wherein the layers are combined outside the die substantially eliminates all pin holes from the composite sheet for improved physical and chemical properties.

Figures 11, 12, 13:
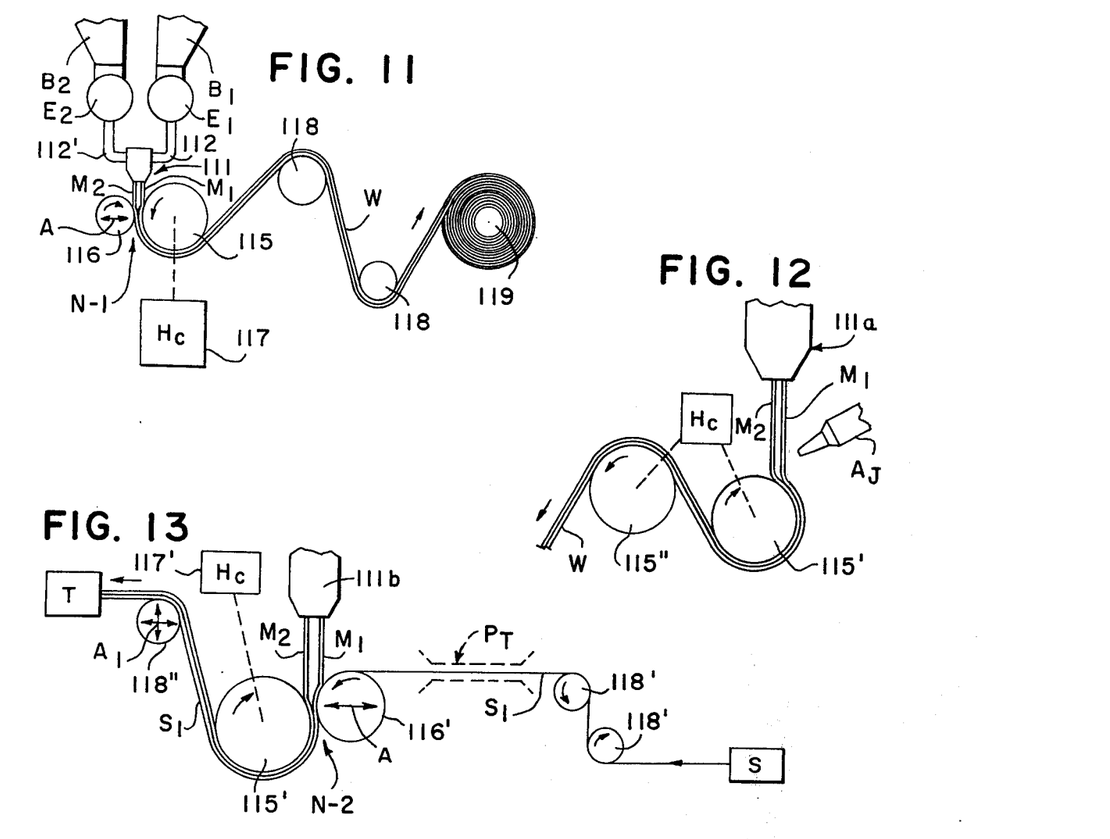
FIG. 11 is an elevational diagrammatic view illustrating a method embodiment of the invention for producing a composite film.
FIG. 12 is an elevational diagrammatic view illustrating another embodiment of the invention producing a composite film.
FIG. 13 is an elevational diagrammatic view illustrating a method embodiment of the invention for laminating coextruded film onto a substrate.

As shown in FIG. 11 the method of the invention is practiced with a relatively simple extrusion setup. A pair of supply bins $B_1$ and $B_2$ are filled with the desired thermo-extrudable materials. Each of the supply bins $B_1$ and $B_2$ are operationally connected to separate extruder means $E_1$ and $E_2$ respectively for conversion of the thermo-extrudable material in each of the bins to melts. Of course where the same material is to be coextruded, only one extruder is necessary. A dual outlet slot die means 111 is suitably connected to each of the extruder means $E_1$ and $E_2$ by flexible coupling adapters 112 and 112'. The die means 111 is preferably one of the constructions discussed in FIGS. 1 through 5; however, other dies capable of producing at least two closely adjacent melt streams may also be utilized.

The die means 111 extrudes two separate closely adjacent molten melt streams $M_1$ and $M_2$ respectively. A pair of rolls 115 and 116 is positioned a relatively short distance below die means 111 and relatively close to one another so as to define bonding nip N-1 therebetween. Roll 115 is provided with a heat control means 117 that maintains the surface of the roll 115 at a temperature substantially below the temperature of the melt stream $M_1$ so that upon contact therewith, the melt stream solidifies. A roll having such heat control means is generally composed of metal and is referred to as a chill roll. Roll 116 is provided with a conventional adjustment means A for selectively moving toward and away from roll 115 for the application of bonding pressure therebetween and is generally a rubber-covered roll. The rolls 115 and 116 are conventionally mounted for rotation toward one another as shown, and are so positioned below die means 11 so that melt stream $M_1$ contacts the downrunning surface of roll 115 while melt stream $M_2$ contact the downrunning surface of roll 116. As the melt streams $M_1$ and $M_2$ travel with their respective roll surfaces toward nip N-1, they contact one another and bond to each other to form a composite multilayer structure or web W. Since only one of the rolls, that is 115, is cooled, melt stream $M_1$ solidifies first on the surface thereof in contact with such roll while the other surface thereof remains somwhat molten for improved bonding with the other melt stream $M_2$. After initial contact of the melt streams with one another, as at nip N-1, they form a composite partially molten web structure that wraps roll 115 for a substantial portion of its periphery whereby the entire composite structure is solidified into a composite web W. A plurality of guide rolls 118 are positioned downstream of the nip N-1 so as to define a somewhat serpentine-like path of web travel through air to takeup roll 119. The takeup roll 119 winds the web W onto a suitable core so as to form a suitable diameter roll composed of web W for storage or use as desired. In certain embodiments, the guide rolls are provided with adjustment means, such as A on roll 116, to selectively vary their respective positions and thereby stretch or orientate the formed composite web W.

FIG. 12 illustrates another setup suitable for the practice of the invention whereby a die means 111a extrudes two closely adjacent but spaced-apart molten melt streams $M_1$ and $M_2$ which have their respective side streams offset from one another so as to avoid edge buildup. A pair of chill rolls 115' and 115'' are positioned in a spaced-apart side-by-side relation below and to one side of die means 111a. As the melt streams $M_1$ and $M_2$ travel downwardly, they pass an air jet means $A_J$, aimed to impinge pressurized air or the like onto the periphery of roll 115'. Air jet $A_J$ forces the two molten melt streams $M_1$ and $M_2$ into contact with each other just as they are approaching the downward running surface of roll 115'. As shown, the inner surface of the melt stream $M_2$ comes into direct contact with the cooled surface of roll 115' while the inner surface of melt stream $M_1$ bonds to the outer surface of melt stream $M_2$. The so-formed partially molten composite structure wraps roll 115' for a distance to substantially solidify at least a portion of melt stream $M_2$. It is then passed to the other chill roll 115'' so that the opposite side of the composite, that is, the outer surface of melt stream $M_1$ contacts the cooled surface of roll 115'' and solidifies the same. The contiguous surfaces between melt streams $M_1$ and $M_2$ form a tightly adhering bond because such surfaces remain at least partially molten over a considerable time and distance allowing excellent bonding to occur. The solidified web W is then guided to a takeup station or the like as desired.

FIG. 13 illustrates an extrusion-coating setup suitable for practice of the invention. A suitable substrate supply S feeds a substrate $S_1$ over a plurality of guide rolls 118' and past an optional pre-treatment means $P_T$ for rendering the substrate more receptive to bonding with molten melt streams. An exemplary form of a pre-treatment means comprises a pair of opposing electrodes positioned on either side of the traveling substrate and operationally connected to a suitable high frequency alternating electrical potential so that a corona discharge is produced therebetween and impinges upon the surfaces of the substrate. Another exemplary form of a pre-treatment means comprises a radiant heat means that heats the passing substrate to a desired temperature. The substrate is selected from a variety of materials and includes, for example, various types and grades of paper, metal foils, plastic films, fabrics, cloth, leather and other various synthetic, natural and/or man-made materials.

The substrate $S_1$ is then guided over a rubber covered roll 116' having an adjustment means A for selected movement in the directions indicated by the double-headed arrow. The die means 111b is positioned above roll 116' so that one of the melt streams $M_1$ extruded therefrom intersects the downrunning surface of roll 116' and contacts the substrate $S_1$ thereon. The other melt stream $M_2$ is extruded in a closely adjacent but spaced apart relation from stream $M_1$ and contacts the downrunning surface of chill roll 115', which is positioned along a parallel horizontal axis with roll 116' and in relatively close-running relation so as to define a bonding nip N-2 therebetween. As the rolls 115' and 116' rotate toward one another, the molten melt streams $M_1$ and $M_2$ are brought into contact with each other under pressure so that a composite structure forms. It will be noted that the melt stream directly bonded to the substrate does not come into direct contact with a cooling surface, that is chill roll 115', so as to remain in its essentially molten state for a period of time during its travel over rolls 116' and 115' so as to obtain improved bonding between melt stream $M_1$ and the substrate $S_1$. Melt stream $M_2$ is chilled or cooled along its outer surface while its inner surface remains relatively molten for bonding with the inner surface of stream $M_1$. Of course, melt streams $M_1$ and $M_2$ may be extruded at different temperatures, say with a difference of up to about 200° F. or more, wherein stream $M_1$ is at a higher temperature than stream $M_2$. In this manner, stream $M_1$ is at a sufficiently high temperature for improved bonding while stream $M_2$ is molten but at a sufficiently lower temperature to avoid deterioration and/or vaporization or odor problems. The formed composite structure of the substrate $S_1$ coated with a multilayer web is then guided over a guide roll 118'' provided with a four-way adjustment means $A_1$ for selective tensioning of the composite structure. The composite web structure is then guided to a suitable takeup station T for storage or use as desired.

Figure 14:
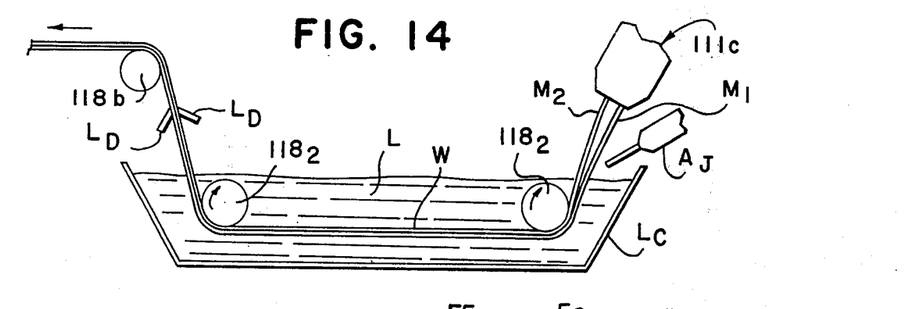
FIG. 14 is an elevational diagrammatic view illustrating another method of producing a composite film.

FIG. 14 illustrates a modified form of a bonding setup for use in the practice of the invention. A die means 111c is pivotally mounted so as to be capable of extruding at an angle to the vertical as shown, or pivoted, to extrude along a vertical plane as desired. The die means 111c extrudes a pair of closely adjacent melt streams $M_1$ and $M_2$ downwardly into a liquid bath $L_C$ having a cooling liquid L therein. An air jet $A_J$ is mounted adjacent the liquid bath so as to impinge the air on the outer surface of melt stream $M_1$ and force it into contact with melt stream $M_2$ prior to the liquid bath. Suitable guide rolls 118$_2$ guide the forming web through the liquid bath for a distance sufficient to solidify individual melts and form a solidified web. Another guide roll 118b guides the composite solidified web upwardly out of the liquid bath and past a pair of wiper means $L_D$, such as conventional doctor blades for removing any adhering liquid from the composite web W and to a further station, such as a tempering oven, a takeup means or the like. The liquid L may comprise cooled water or may include other chemicals, or example, for sensitizing the composite surface for reception of printing ink or the like.

The foregoing illustrations of possible methods as particular embodiments of how the invention is to be carried out, are all particular embodiments involving especially in the form shown extrusion of a film, that is of something with a thickness in the extruded layer of for example 1 to 10 mils. The invention is also usable in a case where sheets are being extruded, as for example something which in the ultimate product might be as thick as 40 mils or more, so that where there is a dual outlet extrusion the thickness of what is being extruded at each outlet might for example be as high as 20 mils or more.

Where such thicker materials are being produced, preferably a method is used in which the extrusion die extrudes horizontally and the material goes between rolls which are in a position in line with the horizontal extrusion and the sheeting continues on a horizontal path until it is either cut off into individual sheets and stacked, or wound around an unusually large roll so as not to bend it undually. The initial rolls through which it passes can well be so called finish calendering rolls, which may for example constitute one roll underneath the material which passes through the rolls and two rolls one on top of each other above the material which passes through the rolls, the lower of these two upper rolls being of course in contact with the material just like the lower roll and the upper of these two upper rolls being a backing or pressure roll. The calendering rolls are maintained to impart a smoother surface and insure a proper dimension to material which has already after extrusion acquired as a result of the size on extrusion a dimension close to that which is ultimately sought.

Figure 15:
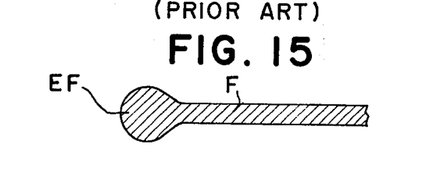
FIG. 15 is a partial longitudinal view buildup at one side of an extruded film formed by the prior art.

FIG. 15 shows one side of a solidified film F having an edge bead EF formed by prior art dies. As can be seen, the edge bead EF is substantially thicker than the other film portion and must be trimmed at the extruder so that a uniform caliber of film may be obtained for further processing.

FIG. 16 illustrates one side of a composite multilayer film F formed in accordance with the invention and comprised of film $F_1$ and $F_2$, each formed of melt streams $M_1$ and $M_2$ respectively. It will be noted that the end edges $EF_1$ and $EF_2$ of each respective film have almost no visible bead so that extruder trimming is substantially eliminated.

As will be appreciated, there are two types of trim in producing commercial flat films. First, there is a trim at or on the extruder itself to eliminate edge beads and associated irregularities. With an average 60 inch film width, the extruder trim is approximately 1 inch on each side or about 3.3% trim. With coextrusion dies producing a multilayered film having each layer composed of a different thermo-extrudable material, this trim is pure waste and cannot be recycled. However, with a die assembly constructed in accordance with the principles of the invention, this waste is substantially eliminated and corresponding economic advantages are realized. The second trim occurs downstream of the extruder and comprises approximately a ½ inch trim on each side of the film.

It will be understood that when films are referred to in the claims, sheets are also included.

Modifications, variations and changes from described preferred exemplary embodiments may be made without departing from the spirit and scope of the novel concepts of the invention.

Having thus described my invention, what I claim as new and desire to secure by Letters Patent is:

1. A die assembly for the extrusion of multiple flat films of thermo-extrudable materials for ultimate creation of materials including more than one such film, comprising:
   a. a die body having at least two separate melt inlets;
   b. at least two manifold chambers positioned within said die body and each in communication with a different one of said melt inlets;
   c. means for separating said manifold chambers from each other throughout their extent;
   d. at least two separate elongated relatively narrow first melt flow passages each in communication with a different manifold chamber for relatively coarse melt flow control;

e. at least two separate elongated relatively narrow second melt flow passages each in communication with a different first melt flow passage for relatively fine melt flow control;

f. at least two separate melt outlet slots having a relatively narrow width dimension and each communicating with a different one of said second melt flow passages, each being defined by a substantially immovable inner wall and a relatively movable outer wall;

means associated with each of said outlet slots for selectively varying the width dimension of each said slot;

h. the separation between at least one pair of melts including a plate member, including a wall of solid insulating material completely separating the respective melts within the die and retarding heat flow between them.

2. A die assembly of claim 1, and heating means associated with each of said melt flow passages for independently regulating the temperature of each melt throughout a flow passage.

* * * * *